United States Patent
Nebot Aparici et al.

(10) Patent No.: US 10,240,868 B2
(45) Date of Patent: Mar. 26, 2019

(54) SUBMERGED COMBUSTION FURNACE FOR PRODUCING FRIT AND METHOD FOR PRODUCING FRIT

(71) Applicant: Colorobbia México, S.A. DE C.V., Nuevo Léon (MX)

(72) Inventors: Antonio Nebot Aparici, Castellón (ES); Sergio Sereni, Castellón (ES); Andrea Tamburini, Castellón (ES); Héctor Viciedo Mompó, Castellón (ES); Arturo Salazar Casas, Nuevo León (MX)

(73) Assignee: Colorobbia México, S.A. DE C.V. (MX)

( * ) Notice: Subject to any disclaimer, the term of this patent is extended or adjusted under 35 U.S.C. 154(b) by 70 days.

(21) Appl. No.: 15/311,385

(22) PCT Filed: May 14, 2015

(86) PCT No.: PCT/ES2015/070386
§ 371 (c)(1),
(2) Date: Nov. 15, 2016

(87) PCT Pub. No.: WO2015/173460
PCT Pub. Date: Nov. 19, 2015

(65) Prior Publication Data
US 2017/0108273 A1   Apr. 20, 2017

(30) Foreign Application Priority Data

May 15, 2014  (MX) .................... MX/a/2014/005966

(51) Int. Cl.
*C03B 5/26* (2006.01)
*C03B 5/235* (2006.01)
(Continued)

(52) U.S. Cl.
CPC ............ *F27B 3/205* (2013.01); *C03B 5/2356* (2013.01); *C03B 5/245* (2013.01); *C03B 5/26* (2013.01);
(Continued)

(58) Field of Classification Search
CPC ......... B22D 39/04; C03B 5/24; C03B 5/2356; C03B 5/26; C03B 5/245; C03B 2211/23;
(Continued)

(56) References Cited

U.S. PATENT DOCUMENTS 3,097,710 A * 7/1963 Copenhefer .......... C03B 37/085
 177/115
3,573,016 A * 3/1971 Rees ........................ C03B 3/00
 65/160
(Continued)

FOREIGN PATENT DOCUMENTS

DE       4027679 A1 *  4/1991  ............... C03B 3/00
DE   102010002523 A1    9/2010

OTHER PUBLICATIONS

International Search Report for Application No. PCT/ES2015/070386.

*Primary Examiner* — Steven B McAllister
*Assistant Examiner* — Steven Anderson, II
(74) *Attorney, Agent, or Firm* — Lerner, David, Littenberg, Krumholz & Mentlik, LLP (57) ABSTRACT

The present invention relates to a submerged combustion furnace for melting ceramic frits by means of a submerged combustion process, said furnace comprising at least one control loop with feedback of the overall weight regulating at least one process variable of the furnace for producing ceramic frit.

The invention also relates to a regulating method for a submerged combustion furnace having these features, (Continued)

whereby obtaining a batch production of a ceramic frit having certain characteristics. The regulating method is implemented in the system by means of regulating process variables relating to the production of molten material during production.

11 Claims, 7 Drawing Sheets

(51) Int. Cl.
*C03B 5/24* (2006.01)
*F27B 3/20* (2006.01)
*F27B 3/28* (2006.01)
*F27D 21/00* (2006.01)
*F27D 3/00* (2006.01)
*F27D 19/00* (2006.01)

(52) U.S. Cl.
CPC .............. *F27B 3/28* (2013.01); *F27D 3/0021* (2013.01); *F27D 21/0028* (2013.01); *C03B 2211/23* (2013.01); *F27D 2019/0003* (2013.01)

(58) Field of Classification Search
CPC ........ F27B 3/205; F27B 3/28; F27D 21/0035; F27D 2019/0003; F27D 3/0021; F27D 21/0028
See application file for complete search history.

(56) References Cited

U.S. PATENT DOCUMENTS

| | | | |
|---|---|---|---|
| 4,539,034 A * | 9/1985 | Hanneken | C03B 3/02 65/134.4 |
| 4,641,319 A * | 2/1987 | Nagai | B22D 39/04 164/453 |
| 5,588,978 A * | 12/1996 | Argent | C03B 3/00 373/27 |
| 2011/0236846 A1 | 9/2011 | Rue et al. | |
| 2012/0006156 A1 | 1/2012 | Daou | |
| 2013/0283861 A1 | 10/2013 | Mobley et al. | |
| 2013/0327092 A1* | 12/2013 | Charbonneau | C03B 5/04 65/29.21 |

* cited by examiner

SUBMERGED COMBUSTION FURNACE FOR PRODUCING FRIT AND METHOD FOR PRODUCING FRIT

CROSS REFERENCE TO RELATED APPLICATIONS

The present application is a national phase entry under 35 U.S.C. § 371 of International Application No. PCT/ES2015/070386, filed May 14, 2015, published in Spanish, which claims the benefit of Mexican Patent Application No. MX/a/2014/005966, filed May 15, 2014. The disclosures of said applications are incorporated by reference herein.

OBJECT OF THE INVENTION

The present invention is comprised in the field of ceramic frit production and relates to a production system and method for producing said ceramic frits by means of using a submerged combustion furnace.

Submerged combustion requires a furnace having burners inside the chamber of the furnace, such that the molten material forms a bath or reservoir of material that is sufficient for accommodating therein the flame of said burners.

One scope of application of submerged combustion furnaces is in molten glass production.

BACKGROUND OF THE INVENTION

Melting ceramic frit in a continuous process is done in conventional facilities having reservoir or bath furnaces built with a refractory chamber and heated by one or several air-gas combustion burners, oxygen-gas combustion burners or a combination for different fuels, which allow reaching temperatures between 1000-1600° C. inside the furnace.

During ceramic frit production, it is important to establish and control optimal operating conditions of said production through a series of parameters, which are hard to stabilize in continuous processes. Furthermore, in the case of frits, it is common to change the composition of the raw material forming the batch of frit to be produced, i.e., the molten product, so said operating production conditions change and must be adjusted in each case.

These changes in production conditions according to the different products to be obtained represent a problem for conventional furnaces.

On the other hand, submerged combustion furnaces are used in molten glass production, where combustion is characterized in that the flame of the burners is completely covered by the molten material bath.

Patent document US 2011/0236846A1 describes a submerged melter with submerged burners contained inside the chamber, in addition to a raw material inlet, a molten material outlet and a gas outlet. This system involves an alternative technology for conventional refractory furnaces, although it does not provide solutions for being applied to the field of ceramic frit.

Patent document U.S. Pat. No. 4,539,034A describes a submerged combustion process applied to the field of glass production, which prevents foaming or bubbling in this process by means of a series of stages in said process. It does not solve other problems existing in ceramic frit production, such as the need for a rapid and effective change in production conditions for obtaining different product batches.

Patent document US 2013/0283861 describes a submerged combustion system for glass, controlled from different parameters relating both to the flame and to the temperature of the chamber. However, it does not solve the drawbacks derived from the production change required by ceramic frit production.

It would therefore be desirable to find a solution for a ceramic frit melting system that simplifies the features of furnaces existing up until now, aiding in the installation startup of the furnace such that it allows a rapid and effective change in frit production composition in different batches, with more versatile and energy efficient furnaces.

DESCRIPTION OF THE INVENTION

The problems described above are solved by means of the present invention, providing both a ceramic frit production system by means of submerged combustion according to claim 1, and a regulating method for said system according to claim 9. The dependent claims define preferred embodiments of the invention.

A first inventive aspect relates to a submerged combustion furnace for melting ceramic frits comprising:
- at least one submerged combustion burner,
- at least one furnace force measurement system to determine the overall weight of the furnace,
- at least one regulating system for regulating at least one process variable of the furnace,
- at least one control loop with feedback of the overall weight, wherein the at least one control loop is adapted for regulating the overall weight by acting on the at least one regulating system for regulating at least one variable of the furnace.

The furnace according to the invention works according to submerged combustion technology.

Said furnace comprises at least one submerged combustion burner inside the combustion chamber adapted for burning the mixture of fuel and combustion agent for melting ceramic frits.

Said at least one burner can be located at the base of the chamber in a fixed manner. It can also be located at any other point of the chamber, the burner being adapted to be able to move until the flame is submerged in the molten material bath. Preferably, a moving burner of this type is located in the ceiling of the chamber and is extendable by means of a shaft to a height above the base of the chamber that is sufficient for being submerged in the molten material bath.

Both the fuel and the combustion agent are supplied to the chamber from fuel feed means and combustion agent feed means, or at least through a mixed feed system, which allows supplying a mixture of fuel and combustion agent necessary for performing combustion by means of the at least one submerged combustion burner.

The furnace of the invention also comprises at least one force measurement system.

Said force measurement system can comprise load cells, strain gages, piezoelectric gages, or any other system that allows determining the overall weight measurement of the furnace.

The overall weight of the furnace is obtained from the sum of the weight of the furnace and the weight of the material inside the chamber, as follows:

$$OW = FW + MW$$

where OW is the overall weight of the furnace, FW is the weight of the furnace and MW is the weight of the material inside the chamber of the furnace.

The weight of the furnace FW comprises the empty weight of the elements of the system when it is not operating, i.e., when said furnace is not producing frit or is not loaded to start a frit production process. Said value of the weight of the furnace FW is kept constant throughout a production process.

The weight of the material contained inside the chamber of the furnace MW includes both the weight of the raw material entering the chamber and the weight of the molten material forming the molten bath inside the chamber.

In a furnace having these features, it is necessary to stabilize the level of the molten bath according to the density and viscosity of the material making up the frit, and according to other characteristics, such that it adapts to optimal melting conditions.

Advantageously, unlike other measurement systems for measuring the level of molten bath in a submerged combustion furnace, such as, for example, x-rays, microwaves, etc., the force measurement system allows continuously obtaining the value of the overall weight of the furnace OW whereas the previous systems are not effective because in furnaces of this type foam is formed on the surface of the molten bath which distorts the measurement taken by these systems. Continuously obtaining the overall weight of the furnace OW in turn allows controlling frit production because the data about the raw material entering the chamber and the amount of molten material exiting the chamber of the furnace are also known.

This force measurement system for measuring force by means of weighing allows advantageously obtaining reliable information about the dimension or amount of molten material bath contained in the chamber of the furnace, and therefore about the level of said molten bath in the chamber.

The submerged combustion furnace of the present invention has at least one regulating system for regulating at least one process variable of said furnace. Process variable is understood as any variable or parameter that can change the conditions and result of a process. In the context of the invention, the raw material feed, the fusion energy supply to the chamber of the submerged melter, the molten material outlet, the temperature in the chamber of the furnace, the temperature of the molten material bath, etc., are examples of process variables.

Advantageously, having at least one regulating system allows controlling parameters of the furnace, through which correct ceramic frit production is controlled, in addition to stabilizing optimal working conditions.

In a particular example in which the process variable regulated by means of the regulating system is the temperature of the chamber or of the material therein, it is necessary to use a temperature sensor which allows regulating and controlling said variable.

The furnace of the present invention also has at least one closed control loop with feedback of the overall weight of the furnace OW. Said feedback is advantageously obtained from the furnace force measurement system which determines the overall weight of the system OW continuously, according to the preceding ratio:

$$OW=FW+MW$$

This means that the system continuously registers the overall weight of the system OW according to the variations occurring with the raw material inlet and molten material outlet.

These results of the overall weight OW measurement are registered by the at least one control loop which acts on the at least one process variable to be regulated through the at least one regulating system, according to the variations registered in the system.

Regulating the System

In a particular embodiment of the furnace of the first inventive aspect, the at least one variable of the submerged combustion furnace that is regulated through the at least one regulating system is selected from at least the raw material feed, the molten material outlet and the fusion energy supply to the furnace.

In a particular embodiment of the furnace of the first inventive aspect, there is at least one regulating system for regulating molten material outlet from the chamber of the furnace.

Advantageously, having a system that is regulated at the outlet allows controlling and regulating the amount of molten material required by the system.

In a particular embodiment, the submerged combustion furnace of the present invention has at least one regulating system for regulating raw material feed into the chamber of the furnace.

Advantageously, having a system that is regulated at the inlet allows controlling and regulating the amount of raw material necessary for obtaining a certain amount of molten material at the outlet of the furnace.

In a particular embodiment, the submerged combustion furnace of the first inventive aspect has at least one regulating system for regulating fusion energy supply to the chamber, which fusion energy is converted to thermal energy by the combustion performed by means of the at least one submerged burner.

The advantage provided from having a regulated fusion energy system is that it allows controlling and regulating the amount of energy necessary for obtaining an optimal melting temperature in the chamber of the furnace, and therefore a homogenous molten material bath at the desired temperature and viscosity. This in turn allows controlling and regulating ceramic frit production.

In a particular embodiment, the submerged combustion furnace for melting ceramic frits of the first inventive aspect is regulated through the process variable corresponding to the molten material outlet, the raw material feed variable being kept constant.

This advantageously allows knowing the value of the raw material inlet into the chamber of the furnace and keeping it constant during production. At the same time, the level of resulting molten material is controlled through the regulating system which regulates the outlet of said molten material from the chamber by means of the control loop and the reference of the overall weight of the furnace OW that is taken.

In a particular embodiment, the submerged combustion furnace for melting ceramic frits of the first inventive aspect is regulated through the raw material feed process variable, the molten material outlet variable being kept constant.

This advantageously allows knowing the value of molten material outlet from the chamber of the furnace and keeping it constant during production. At the same time, the amount of raw material entering the chamber of the furnace is controlled through the regulating system at the inlet of the chamber by means of the control loop and the reference of the overall weight of the furnace OW.

In a particular embodiment, the submerged combustion furnace for melting ceramic frits of the first inventive aspect is regulated through the molten material outlet process variable, both the raw material feed process variable and the fusion energy supply process variable being kept constant.

Advantageously, this allows knowing both the value of raw material inlet into the chamber of the furnace and the amount of energy supplied for melting said raw material, and keeping both values constant during production. At the same time, the level of resulting molten material is controlled through the outlet of said molten material by means of the control loop and the reference of the overall weight of the furnace OW.

In a particular embodiment, the submerged combustion furnace for melting ceramic frits of the first inventive aspect is regulated through the raw material feed process variable, both the molten material outlet variable and the fusion energy supply variable being kept constant.

Advantageously, this allows knowing both the value of the amount of molten material leaving the chamber of the furnace and the amount of energy supplied for melting the incoming raw material, and keeping both values constant during production, whereas the ceramic frit production obtained is controlled through the amount of incoming raw material entering the chamber of the furnace by means of the control loop and the reference of the overall weight of the furnace OW.

In a particular embodiment, the submerged combustion furnace for melting ceramic frits of the first inventive aspect is regulated through the process variable known as the fusion energy supply into the chamber of the furnace, both the variable known as the raw material inlet into the chamber of the furnace and the variable known as the molten material outlet from said chamber being kept constant.

Advantageously, controlling said fusion energy supply allows direct control over the temperature of the molten material, and therefore over its viscosity.

Viscosity is a property characteristic of each molten ceramic frit directly related to the density thereof, so by controlling the temperature of the molten material in the chamber its viscosity is also controlled, and therefore the level of molten material contained inside the chamber of the furnace can be controlled.

Therefore, regulating the amount of fusion energy supplied to the chamber of the furnace by means of the control loop through the reference of the overall weight of the furnace OW allows controlling the amount of molten material leaving the chamber based on the variations in viscosity and temperature of the molten bath, and therefore the level of molten material remaining inside the furnace.

In a particular embodiment, the submerged combustion furnace for melting ceramic frits of the first inventive aspect has three control loops with feedback of the overall weight of the furnace OW. The three control loops act on the process variables, i.e., raw material feed, molten material outlet and fusion energy supply.

The feedback of the control loops is advantageously obtained from the furnace force measurement system which determines the overall weight of the system OW continuously, according to the preceding ratio:

$$OW=FW+MW$$

This means that the system continuously registers the overall weight of the system OW according to the variations occurring in the value of the weight of material inside the chamber MW with the raw material inlet, the molten material outlet and the fusion energy supply.

The obtained results for the value of the overall weight of the system OW are registered by the three control loops which act on the variables to be regulated through regulating systems for each variable, according to the results registered at all times.

Other Elements of the System

In a particular embodiment, the submerged combustion furnace for melting ceramic frits of the first inventive aspect has at least one force measurement system adapted for measuring weight or deformation.

The weight measurement taken by this force measurement system allows advantageously controlling the molten material bath present in the chamber of the furnace at all times. The overall weight of the furnace OW necessary for providing feedback to the control loop or loops present in the system is obtained directly by means of the weight measurement.

The deformation measurement taken by the force measurement system in turn advantageously allows indirectly obtaining the value of the overall weight of the system OW according to the deformation registered in said measurement system.

The force measurement system comprises any weighing system, such as, for example, strain gages, piezoelectric gages or any means which allow measuring or determining, either directly or indirectly, the overall weight of the system OW.

In a particular embodiment, the submerged combustion furnace for melting ceramic frits of the first inventive aspect has a valve, the section of which can be regulated, as the regulating system at the molten material outlet from the furnace.

Advantageously, this valve is variable and allows the controlled discharge of molten material during production and draining of the furnace when production has ended.

In a particular embodiment, the submerged combustion furnace for melting ceramic frits of the first inventive aspect has at least one auxiliary burner. Said auxiliary burner is preferably not submerged and located in the upper wall or ceiling of the chamber of the furnace.

This auxiliary burner advantageously allows assuring the switching on of the submerged combustion burners present in the chamber of the furnace. Given their location, the submerged combustion burners do not have automatic switch-on devices that allow obtaining the flame necessary for performing combustion of the mixture of fuel and combustion agent.

An auxiliary burner also allows assuring combustion in the submerged combustion burners, keeping the flame in said burners. Complete combustion in the entire chamber of the furnace is thereby assured.

As an additional advantage, an auxiliary burner allows performing a process of switching on the furnace in stages, which allows safely performing all operating procedures.

In a particular embodiment, the submerged combustion furnace for melting ceramic frits of the first inventive aspect has a chamber made up of refractory or cooled metal partitions, or a combination thereof, as means for containing the molten bath and the temperature thereof in the case of refractory, and as means of protecting the chamber in the case of cooled metal partitions.

Advantageously, the use of refractory in the chamber of the submerged combustion furnace allows the molten material bath to not become contaminated with impurities of the material forming the wall of the furnace.

In addition, a chamber formed by cooled metal partitions has as an additional advantage of having a lower furnace weight compared to a chamber made up entirely of refractory, and it also reduces the thermal mass that the refractory provides, so installation startup time of the furnace is less.

Preferably, a chamber made up of a combination of both alternatives is used.

Measurement Means of the System

In a particular embodiment, the submerged combustion furnace for melting ceramic frits of the first inventive aspect has at least one regulating system for regulating raw material comprising measurement means for measuring the incoming flow rate ($\dot{m}_e$).

The measurement means for measuring the incoming flow rate comprise any mass or volumetric measurement system, such as, for example, a worm screw system, or a variable or constant velocity measurement system, hopper, vibrating chute, rotary valve, belt scale, etc.

Advantageously, measuring the flow rate of raw material entering the chamber of the furnace allows a data stream which, taken by the at least one control loop regulating the at least one process variable, allows regulating the furnace during its continuous operation.

The incoming flow rate of raw material modifies the value of the weight of material MW inside the chamber of the furnace. Said incoming flow rate of raw material is measured based on the variation of the overall weight of the furnace OW that is registered through the force measurement system, such that said flow rate is quantified based on the information registered in the inlet system.

In a particular embodiment, the submerged combustion furnace for melting ceramic frits of the first inventive aspect has at least one regulating system for regulating molten material outlet comprising measurement means for measuring the outgoing flow rate ($\dot{m}_s$).

The measurement means for measuring the outgoing flow rate of molten material comprise any mass or volumetric measurement system, such as, for example, a valve having a variable section, which allows a molten material discharge by means of gravity and the flow of which is regulated by means of the section of the valve that is open.

Advantageously, measuring the flow rate of molten material exiting the chamber of the furnace allows a data stream which, taken by the at least one control loop regulating the at least one process variable, allows regulating the furnace during its continuous operation.

The outgoing flow rate of molten material modifies the value of the weight of material MW inside the chamber of the furnace. Said outgoing flow rate of molten material is measured based on the variation of the overall weight of the furnace OW that is registered through the force measurement system, such that said flow rate is quantified based on the information registered in the outlet system.

In a second inventive aspect of the invention, the present invention relates to a regulating method for regulating continuous batch production in a submerged combustion furnace according to the first inventive aspect, characterized in that it comprises the steps of:

a) starting up the furnace,
b) pre-loading the furnace with an amount of raw material equal to a weight or tare (W1),
c) maintaining said raw material of weight (W1) until it melts and a homogenous molten bath is obtained,
d) providing a setpoint value of weight (Vw) of molten material to be produced,
e) continuously feeding raw material into the furnace up to a value of weight equal to the sum of the tare (W1) plus the setpoint value of weight (Vw),
f) regulating production by means of the control loop until reaching an optimal melting point, optimal molten material being obtained,
g) discharging molten material by means of the molten material outlet system, simultaneously maintaining the raw material feed, and,
h) ending the molten material outlet from the furnace when the value of the batch is reached.

The production process for producing a ceramic frit batch starts with the first step of the method, in which an operating procedure for switching on the furnace is started. This step can comprise a startup process with several stages, according to the features of the burners of the chamber.

Ceramic frit production is performed by means of the continuous production of a total amount, or batch, which is obtained defining the necessary production characteristics. Said total amount, or batch, is made up of one or more sub-batches, defined by the amount of ceramic frit which the chamber of the furnace allows producing at all times. Since the process is a continuous process, ceramic frit batch production is not interrupted and sub-batches are not delimited during the process.

A ceramic frit batch produced is a defined amount of ceramic frit with certain features that do not change during the continuous production process.

Once suitable operating features have been reached in the chamber of the furnace, the furnace is pre-loaded with an amount of raw material, referred to as tare, and this amount of raw material is melted such that a molten bath is obtained. In submerged combustion furnaces, the level of molten material must reach a minimum height, exceeding that of conventional furnaces, which allows completely accommodating the flame produced by the at least one submerged combustion burner. This implies, as an advantage with respect to said conventional furnaces, a more energy-efficient, homogenous and effective melting process for melting the raw material.

This tare is maintained during ceramic frit batch production process because the composition of said frit does not change during said production process, and because it allows optimal combustion of the required production batch.

In the following step of the method, a setpoint value is provided for the weight of molten material that must be contained in the chamber of the furnace. The value of the weight of the molten material contained in the chamber of the furnace MW is the sum of the tare and of the setpoint value.

Said setpoint value is provided to the control loop, such that it has a threshold, dependent on the tare contained inside the chamber, on the incoming raw material and on the exiting molten material necessary for maintaining correct continuous ceramic frit production.

Once the suitable level of molten bath is reached, the furnace is fed continuously through the raw material feed system up to a value of weight inside the chamber equal to the sum of the tare plus the setpoint value of weight.

Said raw material enters the combustion chamber of the furnace through an inlet into the chamber of the furnace, in a larger or smaller amount according to the defined production conditions and according to whether said raw material inlet is the process variable or one of the process variables regulated in the system.

The raw material feed into the chamber of the furnace continues until a level of homogenous molten bath is obtained inside the chamber equal to the sum of the tare and the setpoint value provided, the measurement or determination of the overall weight of the system OW being obtained by means of the force measurement system.

As raw material is gradually supplied to the chamber of the furnace, ceramic frit production is regulated by means of the at least one control loop. Said regulation involves controlling at least one process variable through at least one regulating system for regulating raw material feed, molten material outlet or fusion energy supply to the chamber of the submerged combustion furnace.

This advantageously allows obtaining an optimal melting point for the material inside the chamber based on regulating the production process, such that the amount of ceramic frit defined in the batch according to an always optimal melting process for melting the raw material entering the chamber is obtained.

As raw material is gradually supplied to the chamber of the furnace, molten material from the furnace is also obtained through the material outlet, which can be regulated and controlled by the control loop.

In a particular embodiment, the system for said molten material outlet that is regulated can be any system which allows the regulated passage of the material of the molten bath, such as, for example, a valve the section of which can be regulated.

In the context of the invention, the molten material discharge at the same time as the raw material feed into the chamber generally involves performing both tasks, i.e., molten material discharge and raw material feed into the chamber, at the same time to keep the level of molten material in the chamber constant. This allows continuous ceramic frit production, since the level of molten material inside the chamber is maintained by the raw material feed that is regulated according to the molten material outlet.

At any given time, the molten material discharge in this step of the production method can be done without requiring a continuous raw material feed, at the same time as the molten material outlet.

Therefore, the continuous ceramic frit production process can be interrupted and only the molten material present in the chamber of the submerged combustion furnace at the beginning of the discharge process can be obtained. Once said discharge process is started, raw material feed into the chamber of the furnace is stopped such that molten material can be emptied out of said chamber.

Once the equivalent to the value of the required batch has been obtained, the molten material outlet is ended by acting on the molten material outlet from the chamber such that the outlet of a further amount of material is not allowed, the level of the bath therein being kept either constant or increasing.

In a particular embodiment of the regulating method for regulating production according to the second inventive aspect, the method furthermore implements the following steps:

i) ending the raw material inlet into the furnace, j) discharging the molten material corresponding to the weight of the tare by means of the outlet system.

Advantageously, the addition of these steps allows complete draining of the submerged combustion furnace, such that a new production can start with a ceramic frit composition other than that of the at least one batch already produced.

In a particular embodiment of the regulating method for regulating production according to the second inventive aspect, the method furthermore implements the following step:

k) switching off the furnace (SCF).

DESCRIPTION OF THE DRAWINGS

The foregoing and other features and advantages of the invention will become clearer from the following detailed description of a preferred embodiment given solely by way of illustrative and non-limiting example in reference to the attached drawings.

DETAILED DESCRIPTION OF THE INVENTION

Figure 1:
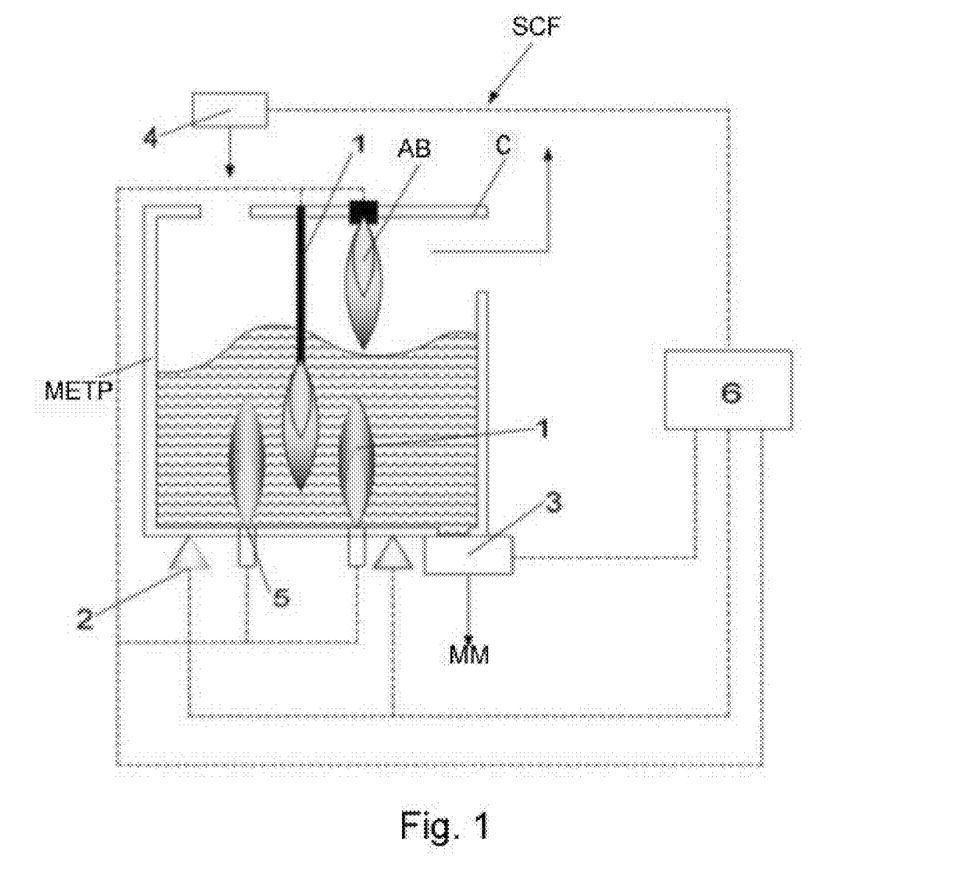
FIG. 1 generally shows a submerged combustion furnace regulated by means of a control loop according to a first embodiment.

FIG. 1 shows a general depiction of the submerged combustion furnace (SCF) of the invention according to a first embodiment thereof.

Said furnace comprises a series of submerged combustion burners (1) located both at the base of the chamber of the furnace (SCF) and in other positions that allow locating them within the molten bath.

In a particular embodiment, these burners (1) can also be located in the ceiling (C) of the chamber and be lowered by means of an extendable shaft until being submerged in the molten bath.

This particular embodiment of the submerged combustion furnace (SCF) also comprises a force measurement system (2) measuring the overall weight (OW) of the furnace, which includes the weight of the furnace FW together with the weight of molten material inside the chamber MW.

The furnace has a molten material outlet (3), controlled by means of a valve the section of which can be regulated, through which the molten material (MM) that is produced is discharged from the chamber of the furnace. Said outlet (3) is regulated through the control loop (6) provided with feedback about the overall weight (OW) obtained through the force measurement system (2), in this case a weight measurement system.

The furnace also has a raw material inlet (4) controlled by means of any system that allows the progressive inlet of material necessary for ceramic frit batch (B) production. Said inlet is regulated through the control loop (6) provided with feedback about the overall weight (OW) obtained through the force measurement system (2), in this case a weight measurement system.

The furnace furthermore has a fusion energy supply (5) controlled by means of any system which allows the entrance of both fuel and combustion agent into the chamber of the furnace (SCF), which are necessary for ceramic frit batch (B) production. Said entrance is regulated through the control loop (6) provided with feedback about the overall weight (OW) obtained through the force measurement system (2), in this case a weight measurement system.

In a particular embodiment, the chamber of the furnace also has an auxiliary burner (AB) located in the ceiling (C) which acts both during furnace startup and after that point, such that complete combustion takes place in the chamber.

This submerged combustion furnace (SCF) can be regulated through the control loop (6) in different ways and through different process variables (X), such as those already mentioned.

In a particular embodiment, the chamber of the furnace (SCF) also has a cooling system in the walls of said chamber formed by metal panels (METP) that are cooled by means of a coolant circulation system (not depicted).

Figure 2:
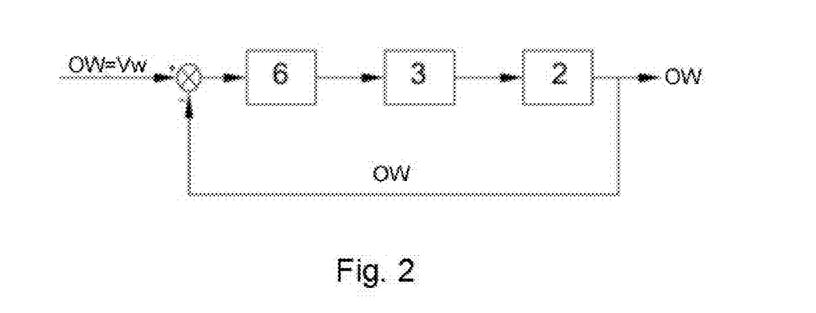
FIG. 2 shows a control loop adapted for regulating the submerged combustion furnace through the molten material outlet.

FIG. 2 shows a control loop (6) regulating ceramic frit production by means of the overall weight (OW). The overall weight (OW) acts both as an inlet variable and an outlet variable, as well as a feedback variable of the control loop (6), the purpose of which is to equal the weight at the inlet of the furnace with the previously defined setpoint value (Vw), such that molten material (MM) production is kept controlled through the level of said molten material bath inside the chamber of the furnace.

Regulation is performed in this case on the regulated molten material outlet (3) system, and the data necessary for controlling and regulating by means of the control loop (6) is taken through the force measurement system (2), in this case a weight measurement system. The process variable (X) that is regulated is therefore the molten material (MM) outlet from the chamber of the furnace (SCF).

Figure 3:
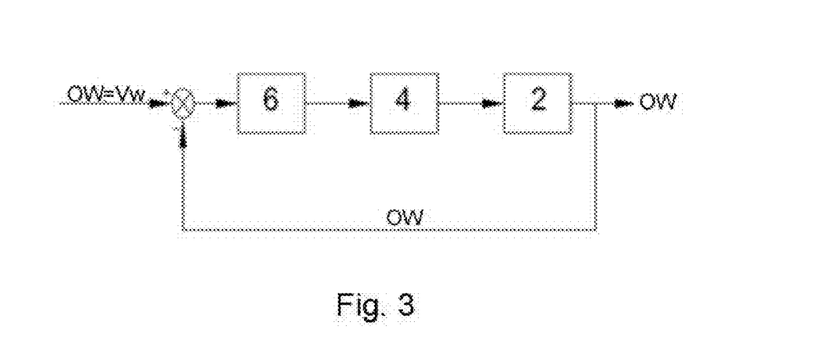
FIG. 3 shows a control loop adapted for regulating the submerged combustion furnace through the raw material inlet.

FIG. 3 shows a control loop (6) regulating ceramic frit production by means of the overall weight (OW). The overall weight (OW) acts both as an inlet variable and an outlet variable, as well as a feedback variable of the control loop (6), the purpose of which is to equal the weight at the inlet of the furnace with the previously defined setpoint value (Vw), such that molten material (MM) production is kept controlled through the level of said molten material bath inside the chamber of the furnace.

Regulation is performed in this case on the regulated raw material inlet (4) system, and the data necessary for controlling and regulating by means of the control loop (6) is taken through the force measurement system (2), in this case a weight measurement system. The regulated process variable (X) is therefore the raw material (RM) inlet of the chamber of the furnace (SCF).

Figure 4:
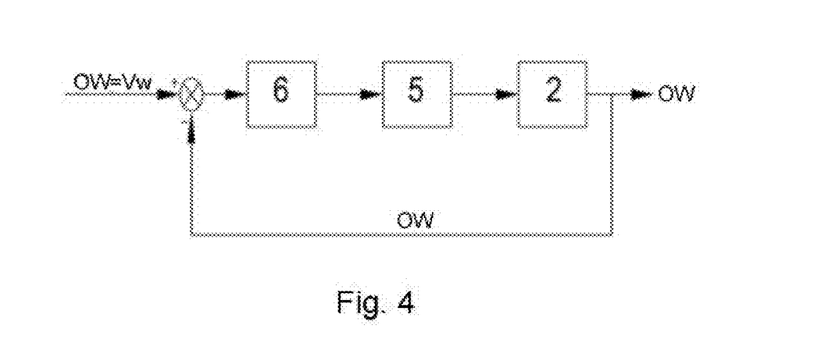
FIG. 4 shows a control loop adapted for regulating the submerged combustion furnace through the fusion energy supply.

FIG. 4 shows a control loop (6) regulating ceramic frit production by means of the overall weight (OW). The overall weight (OW) acts both as an inlet variable and an outlet variable, as well as a feedback variable of the control loop, the purpose of which is to equal the weight at the inlet of the furnace with the previously defined setpoint value (Vw), such that molten material (MM) production is kept controlled through the level of said molten material bath inside the chamber of the furnace.

Regulation is performed in this case on the fusion energy inlet (5) system, and the data necessary for controlling and regulating by means of the control loop (6) is taken through the force measurement system (2), in this case a weight measurement system. The regulated process variable (X) is therefore the fusion energy supply in the chamber of the furnace (SCF).

Figure 5:
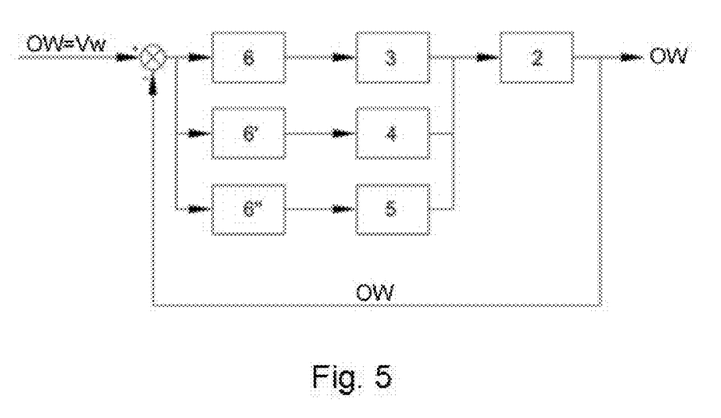
FIG. 5 shows a control loop adapted for regulating the submerged combustion furnace through the molten material outlet, the raw material inlet and the fusion energy supply.

FIG. 5 shows a multivariable control loop (6, 6', 6") regulating ceramic frit production by means of the overall weight (OW). The overall weight (OW) acts both as an inlet variable and an outlet variable, as well as a feedback variable of the control loop (6, 6', 6"), the purpose of which is to equal the weight at the inlet of the furnace with the previously defined setpoint value (Vw), such that molten material (MM) production is kept controlled through the level of said molten material bath.

Regulation is performed in this case on the fusion energy inlet (5) system, on the regulated molten material (MM) outlet (3) system and on the regulated raw material (RM) feed (4) system. Again, the data necessary for controlling and regulating by means of the control loop (6, 6', 6") is taken through the force measurement system (2), in this case a weight measurement system.

In addition, the invention also relates to a continuous ceramic frit production method by means of a submerged combustion furnace, as described below based on FIGS. 6a-6d.

Figure 6A:
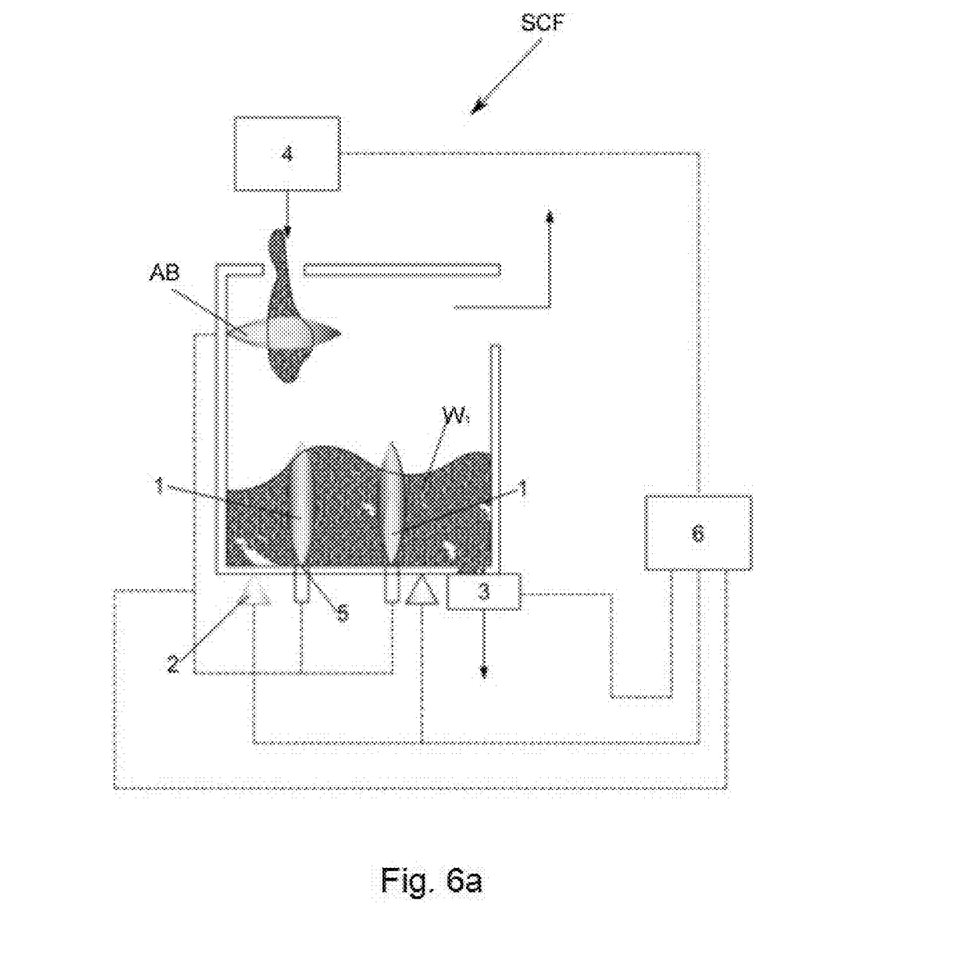
FIG. 6a shows a first part of the continuous ceramic frit batch production process.

FIG. 6a shows the pre-loading of the furnace (SCF) with a raw material (RM) weight equivalent to the tare (W1), entering the chamber of the furnace through the regulated raw material (RM) feed (4) system. The pre-loading of the tare (W1) allows starting up the furnace and obtaining the homogenous molten bath, which allows complete combustion given that the submerged combustion burners (1) have been covered.

Figure 6B:
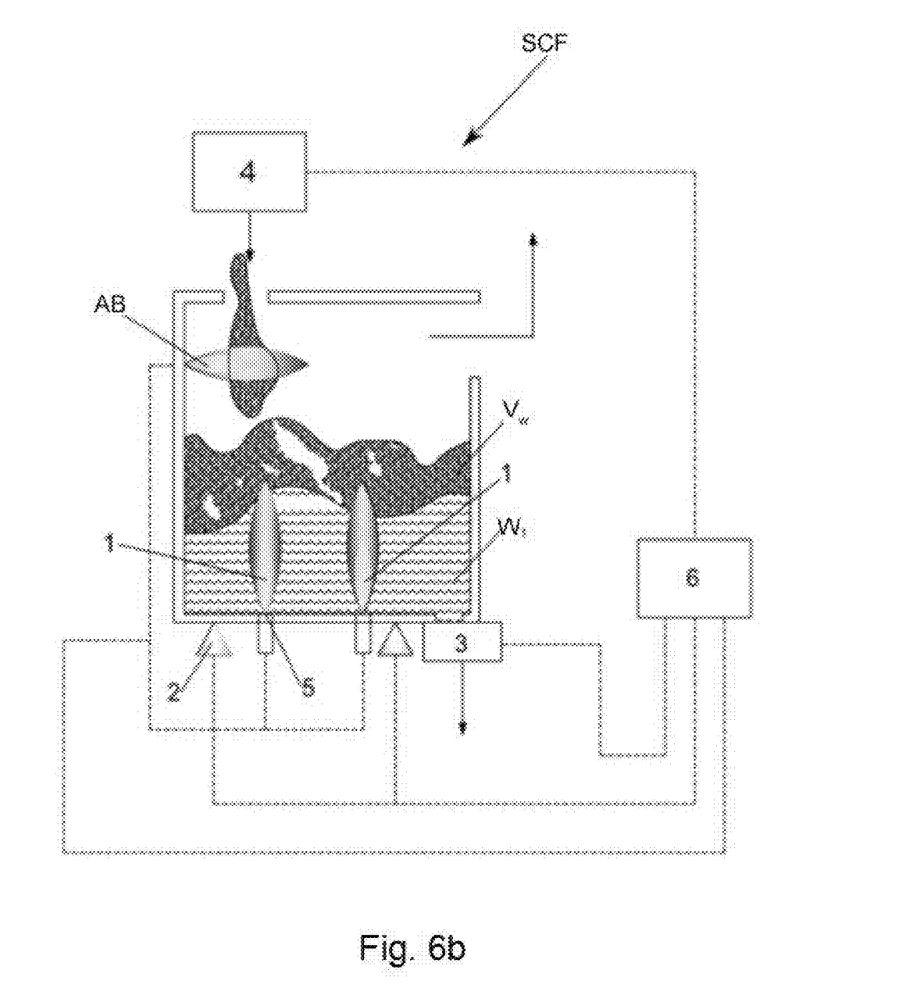
FIG. 6b shows a second part of the continuous ceramic frit batch production process.

FIG. 6b shows how after the pre-loading of the tare (W1) in the chamber of the submerged combustion furnace (SCF), the chamber of the furnace (SCF) is loaded with a setpoint value of weight (Vw) of molten material (MM) to be produced, while the continuous process of feeding raw material (RM) through the raw material (RM) feed (4) system is maintained.

The overall weight of the furnace (OW) must have a value equal to the sum of the weight of the system FW, of the tare (W1) and of the setpoint value (Vw) of molten material (MM).

This is achieved by means of regulating through the control loop (6), which keeps the molten material outlet (3) closed, whereas it allows a raw material feed (4) to remain open until achieving the value of overall weight (OW) that is optimal for ceramic frit production. The fusion energy supply (5) is also regulated to allow melting the raw material (RM) onto the homogenous molten bath.

Figure 6C:
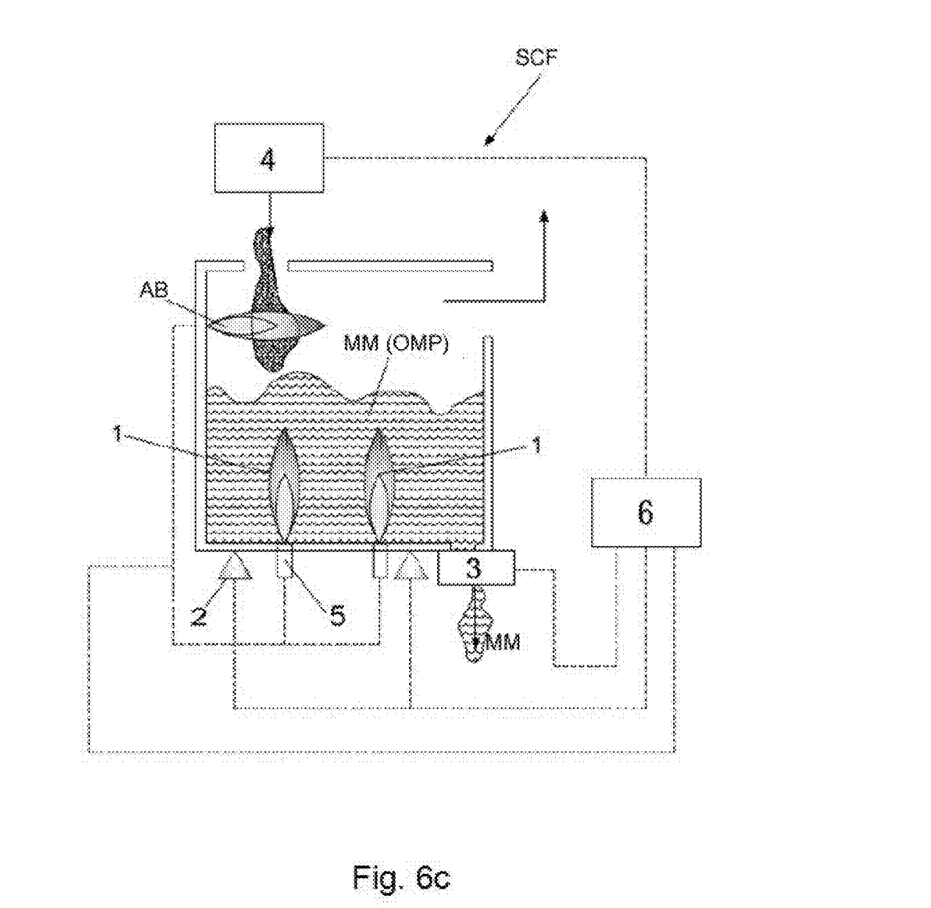
FIG. 6c shows a third part of the continuous ceramic frit batch production process.

FIG. 6c shows an intermediate step of continuous ceramic frit production where the furnace (SCF) is constantly fed (4) while at the same time molten material (MM) forming the batch (B) that is produced is extracted through the outlet (3). Both the outlet (3) and the inlet (4) from/into the chamber of the furnace are regulated by the control loop (6) at the same time as the fusion energy supply (5).

This regulation allows obtaining an optimal melting point (OMP) which allows ceramic frit batch (B) production with suitable quality in an optimal time.

Figure 6D:
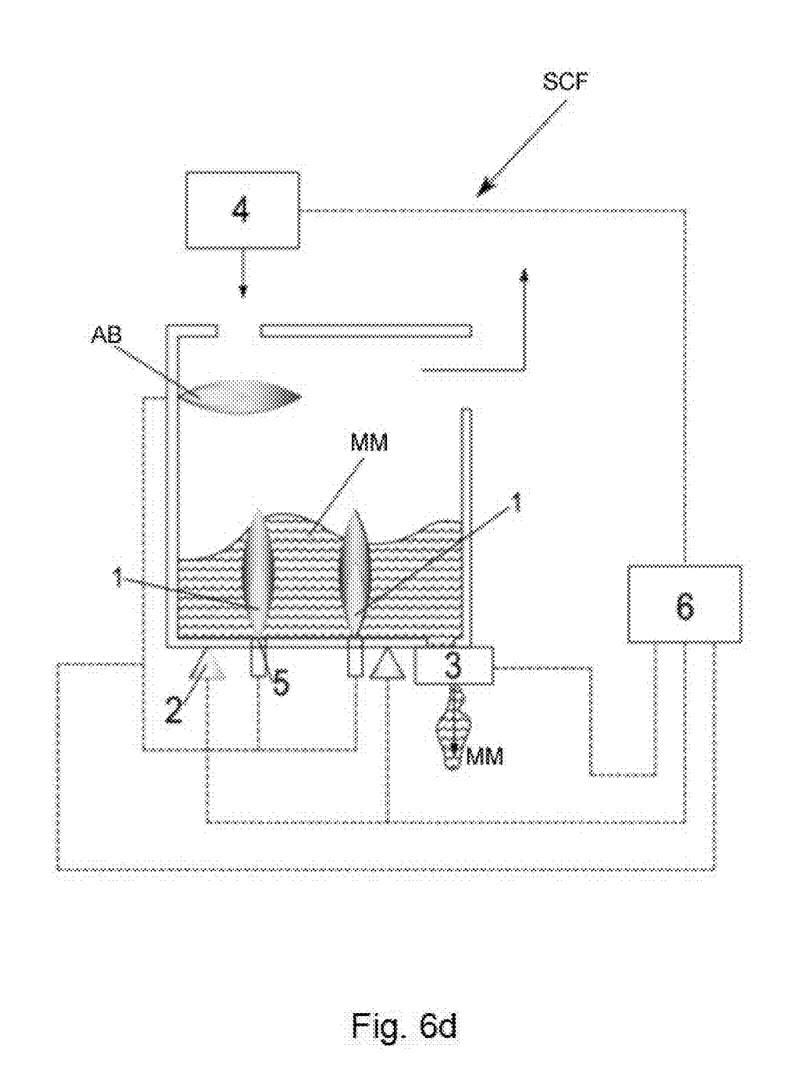
FIG. 6d shows a fourth part of the continuous ceramic frit batch production process.

FIG. 6d shows the final step of the continuous ceramic frit production method, where discharge through the molten material (MM) outlet (3) system begins until obtaining the total amount of ceramic frit making up the desired batch (B).

The invention claimed is:

1. A submerged combustion furnace for melting ceramic frits comprising:
 at least one submerged combustion burner,
 at least one furnace force measurement system to determine the overall weight of the submerged combustion furnace,
 at least one valve for regulating at least one process variable of the submerged combustion furnace, said process variable being a parameter of the submerged combustion furnace suitable for changing the conditions of the melting of ceramic frits,
 at least one control loop with feedback of the overall weight, wherein the at least one control loop is adapted for regulating the overall weight by acting on the at least one valve for regulating the at least one process variable of the submerged combustion furnace, characterized in that the at least one valve is configured to:
regulate the at least one process variable, the at least one process variable being a fusion energy supply to the submerged combustion furnace, and
keep constant the raw material feed into the submerged combustion furnace.

2. The submerged combustion furnace for melting ceramic frits according to claim 1, characterized in that the at least one valve is configured to:
keep constant the molten material outlet from the submerged combustion furnace.

3. The submerged combustion furnace for melting ceramic frits according to claim 1, characterized in that the submerged combustion furnace comprises the at least one control loop and two additional control loops, the control loops being adapted for regulating the overall weight by means of the furnace force measurement, acting on the at least one process variable and two additional process variables,
raw material feed into the submerged combustion furnace,
molten material outlet from the submerged combustion furnace, or
the fusion energy supply.

4. The submerged combustion furnace for melting ceramic frits according to claim 1, characterized in that the at least one furnace force measurement system measures weight or deformation.

5. The submerged combustion furnace for melting ceramic frits according to claim 1, further comprising a second valve having a section that can be regulated, the second valve regulating the material outlet.

6. The submerged combustion furnace for melting ceramic frits according to claim 1, characterized in that the submerged combustion furnace comprises at least one auxiliary burner located in the upper wall or ceiling of the submerged combustion furnace.

7. The submerged combustion furnace for melting frits according to claim 1, characterized in that the chamber of the submerged combustion furnace comprises refractory or cooled metal partitions.

8. The submerged combustion furnace for melting ceramic frits according to claim 1, characterized in that the submerged combustion furnace comprises measurement means for measuring an incoming flow rate, outgoing flow rate or both.

9. A regulating method for regulating continuous batch production in a submerged combustion furnace according to claim 1, the method comprising the steps of:
a) starting up the submerged combustion furnace,
b) pre-loading the submerged combustion furnace with an amount of raw material equal to a weight or tare,
c) maintaining said raw material of weight until it melts and a molten homogenous bath is obtained,
d) providing a setpoint value of weight of molten material to be produced,
e) continuously feeding raw material into the submerged combustion furnace up to a value of weight equal to the sum of the tare plus the setpoint value of weight
f) regulating production by means of the control loop until reaching an optimal melting point, optimal molten material being obtained,
g) discharging molten material by means of the molten material outlet system, simultaneously maintaining the raw material feed, and
h) ending the discharging of the molten material from the submerged combustion furnace when the value of the batch is reached.

10. The regulating method for regulating batch production in a submerged combustion furnace according to claim 9, further comprising the steps of:
i) ending the feeding of the raw material into the submerged combustion furnace,
j) discharging the molten material corresponding to the weight of the tare by means of the outlet system.

11. The regulating method for regulating batch production in a submerged combustion furnace according to claim 10, further comprising the steps of:
k) switching off the submerged combustion furnace.

* * * * *